United States Patent
Matui

(10) Patent No.: US 6,400,778 B1
(45) Date of Patent: Jun. 4, 2002

(54) DC-OFFSET CANCELLER

(75) Inventor: Hitosi Matui, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/205,452

(22) Filed: Dec. 4, 1998

(30) Foreign Application Priority Data

Dec. 4, 1997 (JP) .............................................. 9-334586

(51) Int. Cl.[7] .............................................. H04L 25/06
(52) U.S. Cl. ........................ 375/319; 375/346; 329/320; 329/353; 327/238; 327/254; 327/255; 455/63; 455/67.3
(58) Field of Search ................................ 375/319, 336, 375/344, 285, 346; 329/318, 320, 349, 353; 455/63, 67.3, 222, 296; 327/238, 254, 255

(56) References Cited

U.S. PATENT DOCUMENTS

| | | | |
|---|---|---|---|
| 5,281,968 A | * | 1/1994 | Iwanaga ...................... 341/118 |
| 5,430,894 A | * | 7/1995 | Nohara et al. ............... 455/296 |
| 5,442,655 A | | 8/1995 | Dedic et al. |
| 5,584,068 A | * | 12/1996 | Mohindra ................... 455/324 |
| 5,675,498 A | * | 10/1997 | White ......................... 364/487 |
| 5,748,681 A | * | 5/1998 | Comino et al. ............. 375/319 |
| 5,754,595 A | * | 5/1998 | Honkasalo et al. ......... 375/286 |
| 5,999,347 A | * | 12/1999 | Ichimura et al. ............ 360/32 |
| 6,324,231 B1 | * | 11/2001 | Huang ......................... 375/346 |

FOREIGN PATENT DOCUMENTS

| | | |
|---|---|---|
| GB | 2 267 629 A | 8/1993 |
| JP | 62 216519 | 9/1987 |
| JP | 63296622 | 11/1988 |
| JP | 2142248 | 5/1990 |
| JP | 2249305 | 10/1990 |
| JP | 423859 | 4/1992 |
| JP | 4277956 | 10/1992 |
| JP | 5110616 | 4/1993 |
| JP | 7303126 | 11/1995 |
| JP | 8116340 | 5/1996 |
| JP | 8163191 | 6/1996 |
| JP | 8223240 | 8/1996 |

OTHER PUBLICATIONS

Communication, EP Search Report, 98122567.5–2216–, Nov. 14, 2001.
Hiroshi Suzuki et al., "Affine Transformation for Compensating Linear Distortion: An Application to Linear Signaling Signaling in Mobile Radio", vol. 75, No. 11, Nov. 1, 1992, pp. 47–58.

* cited by examiner

Primary Examiner—Stephen Chin
Assistant Examiner—Dac V. Ha
(74) Attorney, Agent, or Firm—Dickstein Shapiro Morin & Oshinsky LLP

(57) ABSTRACT

A DC-offset canceller in a receiver of a communication system using a burst signal including a training sequence with a predetermined periodicity at the head thereof is disclosed. In the canceller, a quadrature demodulator 112 converts the received burst signal to a base band signal. An AD converter 113 converts an output signal of the quadrature demodulator to a digital signal. A one-cycle delay element 114 makes a delay of an output signal of the AD converter 113 corresponding to one-cycle of the training sequence. A DC-offset detector 115 detects a DC-offset component in the converted signal by the AD converter 113 on the basis of an output signal of the AD converter 113 and an output signal of the one-cycle delay element 114. A subtractor 116 removes the DC-offset component detected by the DC-offset detector 115 from the output signal of the AD converter 113.

16 Claims, 4 Drawing Sheets d: DC-OFFSET (a)

(b)

DC-OFFSET CANCELLER

BACKGROUND OF THE INVENTION

The present invention relates to a DC-offset canceller that removes DC components generated in a data receiver through digital processing. Particularly, the present invention relates to a DC-offset canceller capable of removing the DC components in a case where a frequency offset is included in the received signals having a training signal.

One of the conventional examples of the DC-offset canceller for compensating the DC-offset to be used in the data receiver is one disclosed in Japanese Patent Laid-Open No. 142248 (1990). In FIG. 7, the prime constituents of the DC-canceller disclosed in such an official gazette are illustrated as a block diagram.

According to the configuration shown in FIG. 7, a center frequency can be converted into a signal of frequency $f_2$ as shown in FIG. 8(*a*) by detecting an input signal of frequency $f_1$ supplied to an input terminal 201 by a detector 203 using a local oscillation frequency ($f_1+f_2$) of a local oscillator 203. Then DC components are removed by a capacitor 204. The remainder of the signal is converted into a digital signal by an AD (analog to digital) converter 205, and then it is subjected to a frequency conversion using a sine wave of local oscillation frequency $f_2$ generated from a local oscillator 206 through a frequency converter 207, resulting in an output of center frequency zero (0) as shown in FIG. 8(*b*).

In the case of the conventional DC-offset canceller described above, the DC component is removed by using the capacitor 204 after converting the frequency of input signal into a frequency which does not overlap DC component generated on an analog portion upstream to the capacitor 204. Thus, the capacitor 204 has no effect on an input signal component. A center frequency of the input signal eventually becomes zero (0) by means of the digital processing, so that there is no possibility of introduction the DC component. Therefore, a demodulation of the input signal can be performed without an affection due to the DC components generated on the analog portion.

The conventional DC-offset canceller as described above requires a wide range of frequency band for performing AD conversion on signals in varied frequencies.

The reason is that at least $2(f_2+f_3)$ of sampling frequency is required because frequency components of signals supplied to the AD converter 205 distribute to $f_2+f_3$ as shown in FIG. 8(*a*). If the electric circuit is of without the need for the DC-offset canceller, the sampling frequency may be $2f_3$ or more because frequency components of signals to be supplied to the AD converter 206 distribute to $f_3$ as shown in FIG. 8(*b*).

If the sampling frequency is increased, the power consumption is also increased in proportion to the frequency increase in addition to an increase in the price of the AD converter itself. Therefore, there is a problem of the difficulty in keeping with trends to lower power consumption for the application of DC-offset canceller in any fields including personal digital assistants (PDAs).

In addition, the conventional DC-offset canceller performs the frequency conversion on a digital operation part, so that there is the need for generating a sine wave and performing a filter operation. For generating the sine wave on the digital processing, the DC-offset canceller generally uses a mode of pre-writing the value of sine wave on ROM. In this case, however, there is the problem that the capacity of ROM is increased depending on the conversion frequency.

Besides, there is another problem that the scale of the operation is increased because of the need for performing a multiplication several times in the filter operation.

SUMMARY OF THE INVENTION

Therefore, the present invention is accomplished in view of the problems of the prior art described above, so that it is an object of the present invention is to provide a DC-offset canceller which can be realized by a simple circuit with low power consumption.

According to an aspect of the present invention, there is provided a DC-offset canceller in a receiver of a communication system using a burst signal including a training sequence with a predetermined periodicity at the head thereof, comprising:

a quadrature demodulator for converting the received burst signal to a base band signal;

an AD converter for converting an output signal of the quadrature demodulator to a digital signal;

a one-cycle delay element for making a delay of an output signal of the AD converter corresponding to one-cycle of the training sequence;

a DC-offset detector for detecting a DC-offset component in the converted signal by the AD converter on the basis of an output signal of the AD converter and an output signal of the one-cycle delay element; and a subtractor for removing the DC-offset component detected by the DC-offset detector from the output signal of the AD converter.

According to another aspect of the present invention, there is provided a DC-offset canceller in a receiver of a communication system that performs communication using a burst signal including a training sequence with a predetermined periodicity at the head thereof, comprising:

a quadrature demodulator for converting the received signal to a base band signal;

an AD converter for converting an output signal of the quadrature demodulator to a digital signal;

a one-cycle delay element for making a delay of an output signal of the AD converter corresponding to one-cycle of the training sequence;

a two-cycle delay element for making a delay of an output signal of the AD converter corresponding to two-cycle of the training sequence;

a DC-offset detector for detecting a DC-offset component in the converted signal by the AD converter on the basis of an output signal of the AD converter, an output signal of the one-cycle delay element, and an output signal of the two-cycle delay element; and a subtractor for removing the DC-offset component detected by the DC-offset detector from the output signal of the AD converter.

According to other aspect of the present invention, there is provided a method for performing a DC-offset cancellation in a communication system that performs communication using a burst signal including a training sequence with a predetermined periodicity at the head thereof, comprising:

a first step for converting the received burst signal to a base band signal and then converting the base band signal to a digital signal;

a second step for making a delay of an output signal obtained in the first step so that the delay corresponds to one-cycle of the training sequence;

a third step for detecting a DC-offset component in the digital signal obtained in the first step from both of the digital signal obtained in the first step and the digital signal obtained in the second step; and a fourth step for removing the DC-offset component obtained in the third step from the digital signal obtained in the first step.

According to still other aspect of the present invention, there is provided a method for performing a DC-offset cancellation in a communication system that performs communication using a burst signal including a training sequence with a predetermined periodicity at the head thereof, comprising:

a first step for converting the received burst signal to a base band signal and then converting the base band signal to a digital signal;

a second step for making a delay of an output signal obtained in the first step so that the delay corresponds to one-cycle of the training sequence;

a third step for making a delay of an output signal of the second means corresponding to two cycle of the training sequence;

a fourth step for detecting a DC-offset component in the digital signal obtained in the first step from the digital signals obtained in the first to third steps; and a fifth step for removing the DC-offset component obtained in the fourth step from the digital signal obtained in the first step.

According to still further aspect of the present invention, there is provided a DC-offset canceller comprising:

a first means for converting a received burst signal including a training sequence with a predetermined periodicity to a base band signal;

a second means for converting an output signal of the first means to a digital signal;

a third means for making a delay of an output signal of the second means corresponding to one-cycle of the training sequence;

a fourth means for detecting a DC-offset component in the converted signal by the second means on the basis of output signals of the second and the third means; and a fifth means for removing the DC-offset component detected by the fourth means from the output signal of the second means.

According to other aspect of the present invention, there is provided a DC-offset canceller comprising:

a first means for converting a received burst signal including a training sequence with a predetermined periodicity to a base band signal;

a second means for converting an output signal of the first means to a digital signal;

a third means for making a delay of an output signal of the second means corresponding to one-cycle of the training sequence;

a fourth means for making a delay of an output signal of the second means corresponding to two cycle of the training sequence;

a fifth means for detecting a DC-offset component in the converted signal by the second means on the basis of output signals of the second, third and fourth means; and a sixth means for removing the DC-offset component detected by the fifth means from the output signal of the second means.

In a burst signal transmission, the present invention cancels a DC-offset component by adding a training sequence on the top of burst, detecting the DC-offset component by the use of only a digital operation during receiving the training sequence on the part of receiver, and canceling the DC-offset component from a series of signals in the whole burst on the basis of the detected value.

More specifically, the present invention uses a pattern with a predetermined periodicity as the training sequence added on the top of a burst signal. The DC-offset component is removed from the received signal by detecting the difference between the received signal of training sequence and the received signal one-cycle apart therefrom, which is proportional to the amount of the DC-offset.

Furthermore, the present invention also cancels a frequency offset in addition to the DC-offset since the frequency offset may be extracted from the received signals at three points, a received signal of training sequence, a received signal one-cycle apart therefrom, and a received signal two-cycle apart therefrom.

Other objects and features will be clarified from the following description with reference to attached drawings.

PREFERRED EMBODIMENTS OF THE INVENTION

Preferred embodiments of the present invention will now be described with reference to the drawings.

Figure 1:
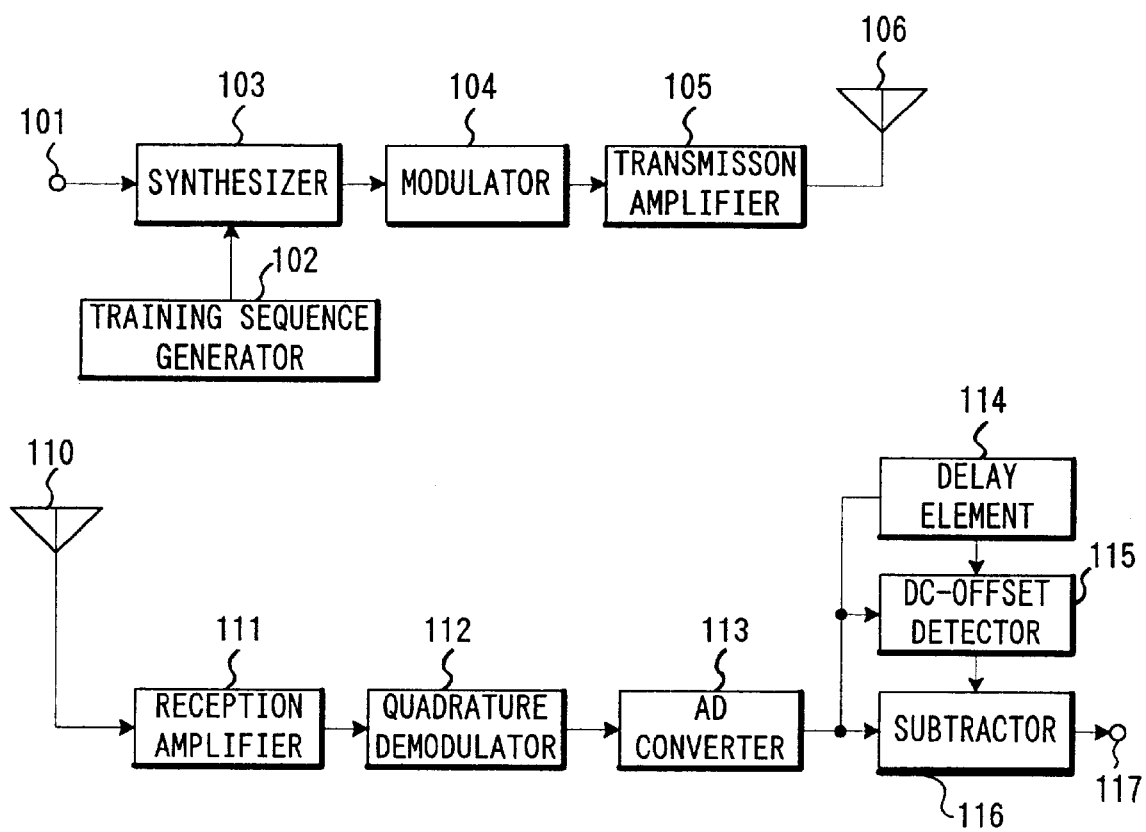
FIG. 1 shows a block diagram illustrating a configuration of a transmitter system as an embodiment of the present invention.

FIG. 1 is a block diagram illustrating a configuration of a transmitter system as an embodiment of the present invention. The transmitter system comprises a transmission part as illustrated in the upper portion of the figure and a receiving part as illustrated in the lower portion of the figure.

The transmission part comprises: an input terminal 101 into which a data signal is supplied; a training sequence generator 102 for generating a training sequence signal; a synthesizer 103 for adding the training sequence generated from the training sequence generator 102 to the top of the input signal; a modulator 104 for modulating the signal having the training sequence added by the synthesizer 103; a transmission amplifier 105 for amplifying the modulated signal; and an antenna for transmitting the amplified modulated signal.

The receiving part comprises: an antenna 110 for receiving the modulated signal; a quadrature demodulator 112 for demodulating the modulated signal; an AD converter 113 for converting the demodulated signal into a digital signal; a delay element 114 for delaying an output of the AD converter 113 for a predetermined time; a DC-offset detector 115 for detecting the amount of DC-offset on the basis of an output of the delay element 114 and an output of the AD converter 113; and a subtractor 116 for subtracting the amount of DC-offset detected by the DC-offset detector 115 from the output of the AD converter 113.

The operation of the present embodiment with the configuration described above will be now described.

Figure 2:
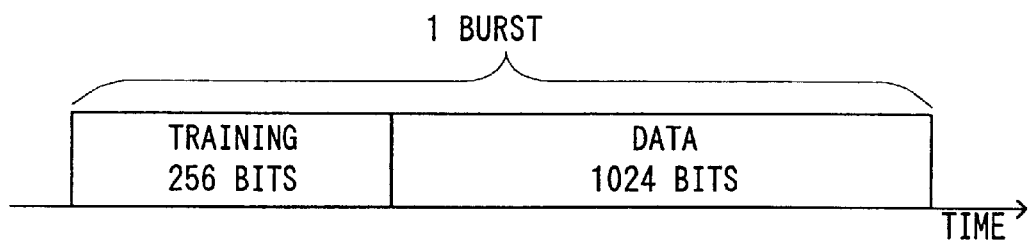
FIG. 2 shows a signal configuration of burst signal in the embodiment.
Figure 3:
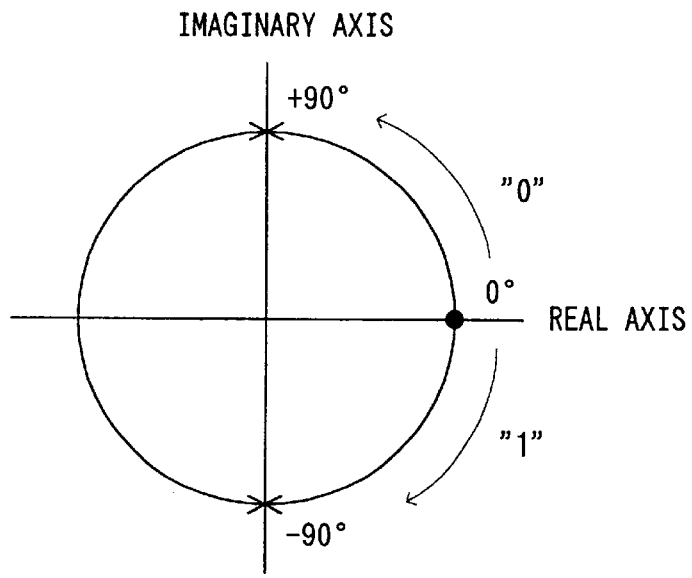
FIG. 3 shows phase changes of MSK signal.

On the transmission part, a training sequence signal is transmitted prior to a data transmission. Here, a repeat of 31 bit M-sequence-pseudo-random number codes is used as the training sequence. The training signal generated from the training sequence generator 102 is combined with a data signal supplied to the input terminal 101 on the synthesizer 103 to form one burst signal. The burst signal configuration is shown in FIG. 2.

The burst signal to be used in this embodiment includes a training sequence as the top (256 bits) thereof and data as the reminder (1,024 bits). The data signal generated from the synthesizer 103 is modulated by the modulator 104. In this case, a minimum shift keying (MSK) modulation is used as its modulation system.

The MSK modulation is the modulation system in which a 90 degree phase shift in a counterclockwise direction is occurred when the input signal to the modulator is "zero (0)", while a 90 degree phase shift in a clockwise direction is occurred when the input signal to the modulator is "one (1)".

The signal modulated by the modulator 104 is amplified by the transmission amplifier 105 and subsequently transmitted from the antenna 106.

On the receiving part, a signal supplied from the antenna 110 is amplified by the receiving amplifier 111, a complex base band signal by the quadrature demodulator 12, and subsequently converted into a complex base band signal by the AD converter 113.

Figure 4:
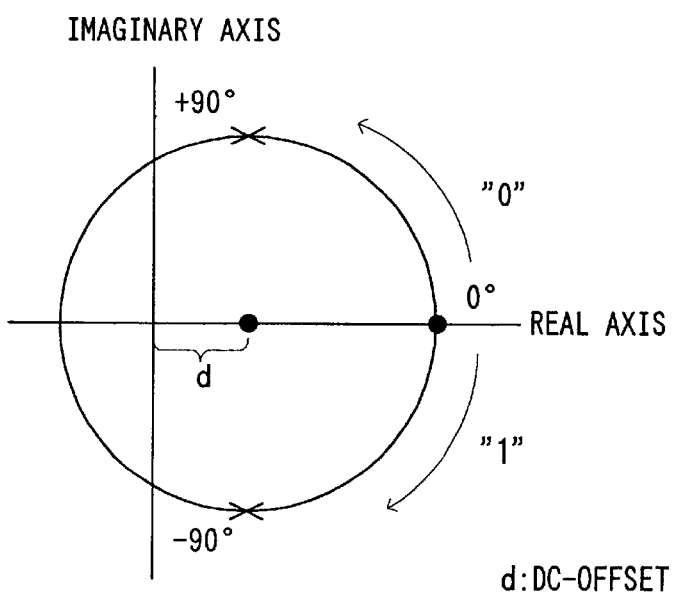
FIG. 4 shows MSK signal on which DC-offset is added.

By the way, DC-offset generated from analog circuits of the transmission part and the receiving part are respectively added on an imaginary component and a real component of the digital signal. The addition of DC-offset leads to the degradation of demodulation characteristics as a result of a change (see FIG. 4) in amplitude-phase characteristic of the modulated signal shown in FIG. 4. Therefore, the need for the DC-offset canceller arises from such degradation.

The AD-converted complex digital signal is supplied to the delay element 114 which has a delay of 31 symbols corresponding to one cycle of the training sequence as 31 bits of M-sequence pseudo random number code. If the DC-offset is absent, the phase difference between an output of the AD converter 113 and an output of the delay element 114 becomes zero (0). If the DC-offset is present, on the other hand, the phase difference between the outputs is occurred depending on the amount of the DC-offset.

A DC-offset detector 115 detects the DC-offset on the basis of the complex output signal $u_{n+31}$ from the AD converter 113 and a complex output signal $u_n$ of the delay element 114. These complex output signals $u_{n+31}$ and $u_n$ can be represented by the following equations, respectively.

$$u_n = d + r_n \quad (1)$$

$$u_{n+31} = d + r_{n+31} = d + jr_n \quad (2)$$

wherein d denotes a DC-offset component, and $r_n$ and $r_{n+31}$ are their respective received signals when the DC-offset is absent. In addition, the MSK-modulated training sequence shows periodicity as described by the following equation.

$$r_{n+31} = jr_n \quad (3)$$

Therefore, it can be modified as represented by the equation (2), where j denotes an imaginary unit.

Using the above equations (1) and (2), a DC-offset component d can be derived from the following equation.

$$d = [(1-j)u_n + (1+j)u_{n+31}]/2 \quad (4)$$

As the division of 2 in the equation (4) can be performed in a bit shift, an actual arithmetic circuitry can be only performed through the use of an adder and a sifter.

A subtractor 116 eliminates the DC-offset component detected by the DC-offset detector 115 from the complex digital signal, allowing the output of complex signal without the DC-offset component from the subtractor 116.

Figure 5:
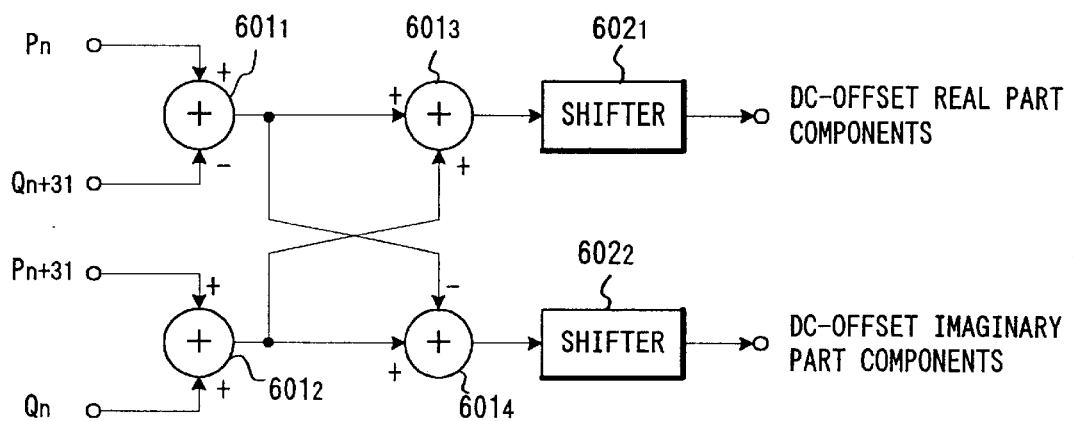
FIG. 5 shows a schematic circuit diagram for illustrating a configuration of the DC-offset detector 115 of FIG. 1.

FIG. 5 is a schematic circuit diagram for illustrating a configuration of the DC-offset detector 115 of FIG. 1. In this figure, real part components of the received signals $r_n$ and $r_{n+31}$ are respectively defined as $p_n$ and $p_{n+31}$, while imaginary part components of them are respectively defined as $q_n$ and $q_{n+31}$.

This circuit is obtained by modifying the equation (4) as follows.

$$\begin{aligned} d &= [(1-j)u + (1+j)u_{n+31}]/2 \\ &= [(1-j)(p_n + jq_n) + (1+j)(p_{n+31} + jq_{n+31})]/2 \\ &= \{[(p_{n+31} + q_n) + (p_n - q_{n+31})] + j[(p_{n+31} + q_n) + \\ &\quad (p_n - q_{n+31})]\}/2 \end{aligned} \quad (5)$$

The DC-offset detector 115 shown in FIG. 5 performs the operation of the above equation (5). As shown in the figure, the DC-offset detector 115 comprises: an adder $601_1$ for subtracting the imaginary part component $q_{n+31}$ from the real part component $p_n$; an adder $601_2$ for adding output of the real part component $p_{n+31}$ and the imaginary part component $q_n$; an adder $601_3$ for adding output of the adder $601_1$ and output of the adder $601_2$; an adder $601_4$ for subtracting the output of adder $601_1$ from the output of adder $601_2$; and shifters $602_1$ and $602_2$ for performing a bit shift on the output of the adder 6011; and a shifter 6022 for performing a bit shift on the outputs of the adders $601_3$ and $601_4$, respectively. As is understandable from the foregoing, the components that makes up the DC-offset detector 115 are only four adders $601_1$–$601_4$ and two sifters $602_1$ and $602_2$, allowing an exceedingly simple configuration.

A second embodiment of the present invention will be now described in detail with reference to drawing.

Figure 6:
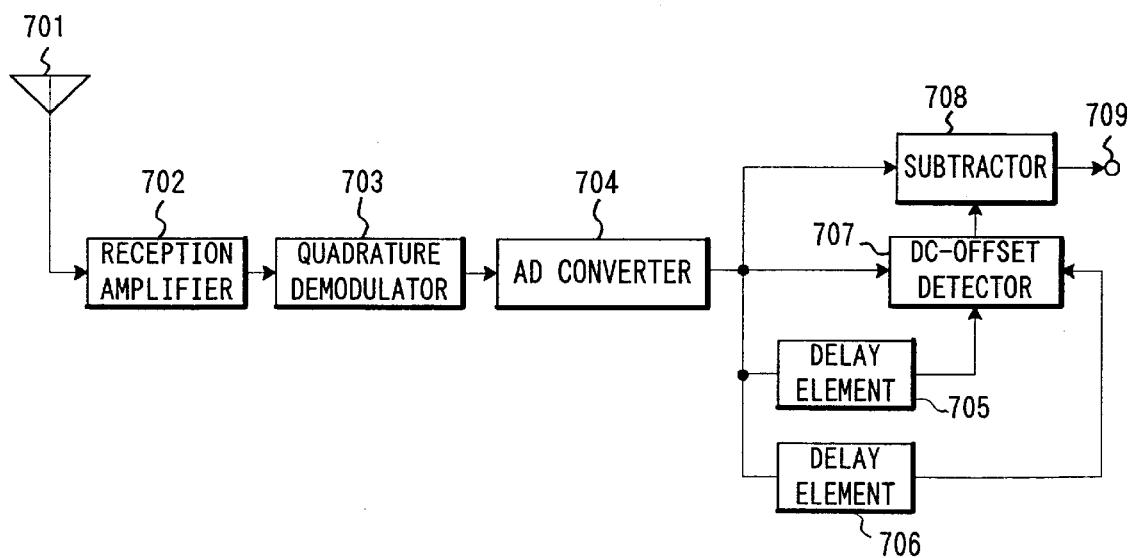
FIG. 6 shows a schematic circuit diagram for illustrating a configuration of the second embodiment of the present invention.
Figure 7:
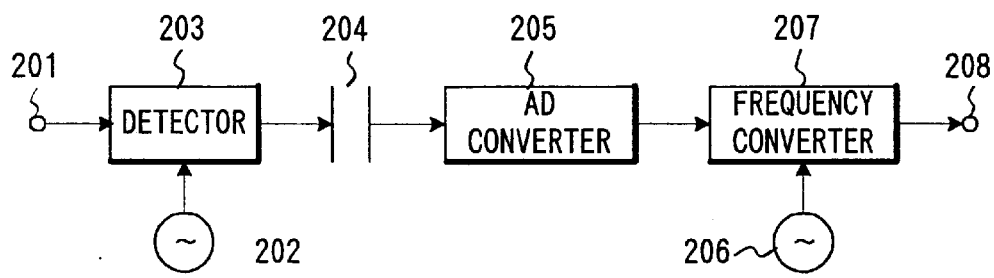
FIG. 7 shows a block diagram showing a prior art DC-canceller.
Figure 8:
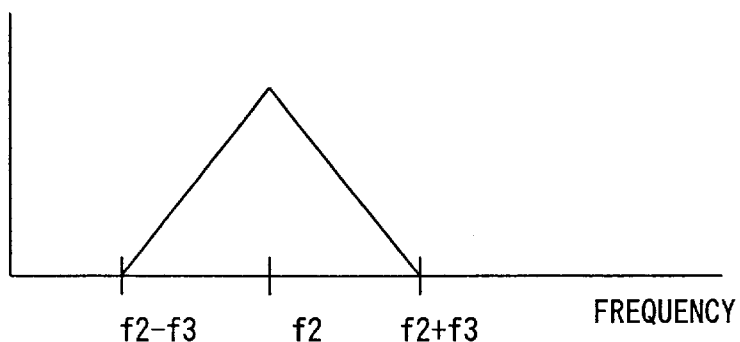
FIGS. 8(*a*) and (*b*) show frequency components in the prior art.
Figure 8:

FIG. 6 is a schematic circuit diagram for illustrating a configuration of the second embodiment of the present invention. In the case of shown in FIG. 6, two delay elements 705, 706 are provided. The delay element 705 has delay of 31 symbols corresponding to one cycle of the training sequence as 31 bits of M-seers pseudo random number code, and also the delay element 72 has delay of 62 symbols corresponding to two cycles of the training sequence. A DC-offset detector 707 detects a DC-offset on the basis of an output signal $u_{n+62}$ of an AD converter 704, an output $u_{n+31}$ of the delay element 705, and an output $u_n$ of the delay element 706.

If a frequency offset is included in an output signal of the AD converter 704, the equation (2) does not hold because the amount of the phase shift between the signals 31 symbols apart in the received training sequence signal includes not only the amount of deviation depending on the DC-offset but also other factors. Therefore, the equation (4) cannot be introduced. It means that the configuration of the first embodiment cannot detect the DC-offset, properly.

Thus, the DC-offset should be detected by another detecting procedure based on the following equation when the frequency offset is included in the output signal of the AD converter.

The output signal $u_n$ of the delay element 706, in which DC-offset d and frequency offset $\Delta f$ are included, can be represented by the following equation where $\Delta\omega = 2\pi\Delta f$.

$$u_n = d + r_n \exp(j\Delta\omega nT) \quad (6)$$

Similarly, the output signal of the delay element 705 and the output signal of the delay signal can be represented by the following equations.

$$u_{n+31} = d + r_{n+31}\exp[j\Delta\omega(n+31)T] \quad (7)$$
$$= d + jr_n\exp(j\Delta\omega n + T)\exp(j31\Delta\omega T)$$

$$u_{n+62} = d + r_n + 62\exp[j\Delta\omega(n+62)T] \quad (8)$$
$$= d - r_n(j\Delta\omega nT)\exp(j62\Delta\omega T)$$

Then, the following equation is drawn from the equations, (6), (7), and (8).

$$(u_{n+62}-u_{n+31})/(u_{n+31}-u_n)=j\exp(j31\Delta\omega T) \quad (9)$$

The amount of the frequency offset can be detected from the equation (9), so that the DC-offset can be also detected by the following equation by the use of the equation (6) in addition to substitute the equation (9) into the equation (8).

$$d=[(u_{n+31})(u_{n+31})-u_n u_{n+62}]/(2u_{n+31}-u_{n+62}-u_n) \quad (10)$$

Whether or not to include the frequency offset, therefore, the value of DC-offset can be correctly detected by the calculation based on the equation (10) with input of the signals $u_n$, $u_{n+31}$, and $u_{n+62}$ in the DC-offset detector 707.

A complex signal without DC-offset can be obtained by the subtracter 708 by removing the DC-offset component detected by the DC-offset detector 707 from a complex digital signal.

Accordingly, the present invention is configured as described above, so that it produces the effects of: easily realizing a simple circuit and a substantial saving in electric power by canceling a DC-offset by the use of two received signals (i.e., a received signal of training sequence and a received signal one-cycle apart from the former); and additionally avoiding the influence of frequency offset if the DC-offset cancellation is performed by the use of three received signals (i.e., a received signal of training sequence, a received signal one-cycle apart from the former, and a received signal two cycle apart).

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A DC-offset canceller in a receiver of a communication system using a burst signal including a training sequence with a predetermined periodicity at the head thereof, comprising:

a quadrature demodulator for converting the received burst signal to a base band signal;

an AD converter for converting an output signal of the quadrature demodulator to a digital signal;

a one-cycle delay element for making a delay of an output signal of the AD converter corresponding to one-cycle of the training sequence;

a DC-offset detector for detecting a DC-offset component in the converted signal by the AD converter on the basis of an output signal of the AD converter and an output signal of the one-cycle delay element; and a subtractor for removing the DC-offset component detected by the DC-offset detector from the output signal of the AD converter.

2. A receiver of a communication system performing a communication using a burst signal including a training sequence at the top thereof, the receiver includes the DC-offset canceller of claim 1.

3. A communication system that performs a communication using a burst signal including a training sequence at the top thereof, wherein the receiver includes the DC-offset canceller of claim 1.

4. A DC-offset canceller in a receiver of a communication system that performs communication using a burst signal including a training sequence with a predetermined periodicity at the head thereof, comprising:

a quadrature demodulator for converting the received signal to a base band signal;

an AD converter for converting an output signal of the quadrature demodulator to a digital signal;

a one-cycle delay element for making a delay of an output signal of the AD converter corresponding to one-cycle of the training sequence;

a two-cycle delay element for making a delay of an output signal of the AD converter corresponding to two-cycle of the training sequence;

a DC-offset detector for detecting a DC-offset component in the converted signal by the AD converter on the basis of an output signal of the AD converter, an output signal of the one-cycle delay element, and an output signal of the two-cycle delay element; and a subtractor for removing the DC-offset component detected by the DC-offset detector from the output signal of the AD converter.

5. A receiver of a communication system performing a communication using a burst signal including a training sequence at the top thereof, the receiver includes the DC-offset canceller of claim 4.

6. A communication system that performs a communication using a burst signal including a training sequence at the top thereof, wherein the receiver includes the DC-offset canceller of claim 4.

7. A method for performing a DC-offset cancellation in a communication system that performs communication using a burst signal including a training sequence with a predetermined periodicity at the head thereof, comprising:

a first step for converting the received burst signal to a base band signal and then converting the base band signal to a digital signal;

a second step for making a delay of an output signal obtained in the first step so that the delay corresponds to one-cycle of the training sequence;

a third step for detecting a DC-offset component in the digital signal obtained in the first step from both of the digital signal obtained in the first step and the digital signal obtained in the second step; and a fourth step for removing the DC-offset component obtained in the third step from the digital signal obtained in the first step.

8. A method for performing a DC-offset cancellation in a communication system that performs communication using a burst signal including a training sequence with a predetermined periodicity at the head thereof, comprising:

a first step for converting the received burst signal to a base band signal and then converting the base band signal to a digital signal;

a second step for making a delay of an output signal obtained in the first step so that the delay corresponds to one-cycle of the training sequence;

a third step for making a delay of an output signal of the second means corresponding to two cycle of the training sequence;

a fourth step for detecting a DC-offset component in the digital signal obtained in the first step from the digital signals obtained in the first to third steps; and a fifth step for removing the DC-offset component obtained in the fourth step from the digital signal obtained in the first step.

9. A DC-offset canceller comprising:

a first means for converting a received burst signal including a training sequence with a predetermined periodicity to a base band signal;

a second means for converting an output signal of the first means to a digital signal;

a third means for making a delay of an output signal of the second means corresponding to one-cycle of the training sequence;

a fourth means for detecting a DC-offset component in the converted signal by the second means on the basis of output signals of the second and the third means; and a fifth means for removing the DC-offset component detected by the fourth means from the output signal of the second means.

10. A DC-offset canceller comprising:

a first means for converting a received burst signal including a training sequence with a predetermined periodicity to a base band signal;

a second means for converting an output signal of the first means to a digital signal;

a third means for making a delay of an output signal of the second means corresponding to one-cycle of the training sequence;

a fourth means for making a delay of an output signal of the second means corresponding to two cycle of the training sequence;

a fifth means for detecting a DC-offset component in the converted signal by the second means on the basis of output signals of the second, third and fourth means; and a sixth means for removing the DC-offset component detected by the fifth means from the output signal of the second means.

11. The DC-offset canceller according to claim 9 or 10, wherein M sequence pseudo random number codes is used as the training sequence.

12. The DC-offset canceller according to claim 9 or 10, wherein the burst signal includes a training sequence as the top thereof and data as the reminder.

13. The DC-offset canceller according to claim 9 or 10, wherein the fourth means comprises, a first means for subtracting the imaginary part component of the received signal from the real part component of the delayed received signal; a second means for adding output of the real part component of the delayed received signal and the imaginary part component of the received signal; a third means for adding output of the first means and output of the second means; a fourth means for subtracting the output of first means from the output of second means; and a sixth and seventh means for performing a bit shift on the output of the first, third and fourth means, respectively.

14. The DC-offset canceller according to claim 13, wherein the first to fourth means are adders, and the fifth and sixth means are shifters.

15. The DC-offset canceller according to claim 9 or 10, wherein the fifth means comprises, a first means for subtracting the imaginary part component of the received signal from the real part component of the delayed received signal; a second means for adding output of the real part component of the delayed received signal and the imaginary part component of the received signal; a third means for adding output of the first means and output of the second means; a fourth means for subtracting the output of first means from the output of second means; and a sixth and seventh means for performing a bit shift on the output of the first, third and fourth means, respectively.

16. The DC-offset canceller according to claim 15, wherein the first to fourth means are adders, and the fifth and sixth means are shifters.

* * * * *